United States Patent [19]

Miller

[11] 4,233,157
[45] Nov. 11, 1980

[54] TRAVELLING SHEET, FLAT-BED FILTER APPARATUS AND SYSTEM

[76] Inventor: Peter A. Miller, Mozartstrasse 16, D 6370 Oberursel, Fed. Rep. of Germany

[21] Appl. No.: 854,192

[22] Filed: Nov. 23, 1977

Related U.S. Application Data

[63] Continuation-in-part of Ser. No. 466,171, Apr. 10, 1975, abandoned.

[51] Int. Cl.³ .................... B01D 29/02; B01D 29/36
[52] U.S. Cl. .................................. 210/137; 210/143; 210/387; 210/406; 210/416 R
[58] Field of Search .................... 210/68, 75, 77, 89, 210/90, 95, 120, 193, 195 R, 216, 218, 387, 406, 400, 401, 416 R, 445, 446, 137, 143

[56] References Cited

U.S. PATENT DOCUMENTS

| | | | |
|---|---|---|---|
| 262,702 | 8/1882 | Sears et al. | 210/416 R |
| 1,595,345 | 8/1926 | Lomax | 210/416 RX |
| 1,793,449 | 2/1931 | Bassler | 210/400 |
| 1,881,404 | 10/1932 | Hadley | 210/400 X |
| 2,477,404 | 7/1949 | Butt, Jr. | 210/416 RX |
| 2,528,642 | 11/1950 | Cover | 210/406 X |
| 2,665,812 | 1/1954 | Crane | 210/387 X |
| 2,736,434 | 2/1956 | Yacoe | 210/387 X |
| 3,035,094 | 2/1967 | Casson | 210/387 X |
| 3,063,216 | 11/1962 | Silverman | 210/400 X |
| 3,091,336 | 5/1963 | Hirs | 210/387 X |
| 3,104,223 | 9/1963 | Kasuya | 210/406 X |
| 3,138,015 | 6/1964 | Avery | 210/387 X |
| 3,199,677 | 8/1965 | Schneider | 210/193 X |
| 3,214,025 | 10/1965 | Halperm | 210/416 RX |
| 3,249,438 | 5/1966 | Topol | 210/406 X |
| 3,273,717 | 9/1966 | Canterbury | 210/416 RX |
| 3,404,779 | 10/1968 | Weathers | 210/387 X |
| 3,497,063 | 2/1970 | Hirs | 210/75 |
| 3,690,466 | 9/1972 | Lee et al. | 210/406 X |
| 3,731,808 | 5/1973 | Rickert | 210/387 X |

FOREIGN PATENT DOCUMENTS

| | | |
|---|---|---|
| 682184 | 11/1966 | Belgium . |
| 249699 | 7/1912 | Fed. Rep. of Germany . |
| 1225961 | 9/1966 | Fed. Rep. of Germany . |
| 1218406 | 12/1966 | Fed. Rep. of Germany . |
| 1966717 | 8/1967 | Fed. Rep. of Germany . |
| 1611063 | 7/1970 | Fed. Rep. of Germany . |
| 1611081 | 10/1970 | Fed. Rep. of Germany . |
| 7145136 | 4/1972 | Fed. Rep. of Germany . |
| 1461397 | 11/1972 | Fed. Rep. of Germany . |
| 2323082 | 11/1974 | Fed. Rep. of Germany ........... 210/387 |
| 2546093 | 4/1977 | Fed. Rep. of Germany ........... 210/387 |
| 2546381 | 4/1977 | Fed. Rep. of Germany ........... 210/387 |
| 2552719 | 5/1977 | Fed. Rep. of Germany ........... 210/387 |
| 1508387 | 1/1968 | France . |
| 4612357 | 3/1971 | Japan .................................. 210/387 |
| 1149444 | 4/1969 | United Kingdom . |

Primary Examiner—Robert H. Spitzer
Attorney, Agent, or Firm—Frishauf, Holtz, Goodman & Woodward

[57] ABSTRACT

Fluid supplied from a contaminant tank holding the fluid to be filtered, and delivered at a filtered fluid outlet, is supplied to a filter housing which defines a chamber therein subdivided by a perforate divider plate over which the filter paper is guided, and on which it is supported. The filter paper subdivides the chamber in an upper, or contaminant chamber, and a lower, or filtrate chamber. The lower or filtrate chamber is connected to a vacuum and suction pump. The upper portion of the housing can be raised off the filtrate paper and its support to permit movement of the filtrate paper. The contaminated fluid to be filtered is guided from the contaminant tank to the upper filter chamber, without any intermediate pumping apparatus or the like, all pumping being done by the suction and vacuum pump connected to the filtrate chamber, so that pumping equipment connected to the installation need not handle contaminated materials which may contain obstructing, abrasive or cutting particles, such as metal shavings, husks of plant material used in oil extraction processes, or the like, or toxic or biologically contaminated materials.

3 Claims, 9 Drawing Figures

TRAVELLING SHEET, FLAT-BED FILTER APPARATUS AND SYSTEM

The present application is a Continuation-in-Part of my earlier application Ser. No. 466,171, filed Apr. 10, 1975, abandoned upon filing of this application.

The present invention relates to a travelling sheet, flat-bed web-type filter in which a filter, typically a paper or fabric filter web is transported, in steps, over a support, the material to be filtered being applied to the top side of the filter medium web, and the filtrate being removed from the bottom side thereof.

BACKGROUND AND PRIOR ART

Various types of web or travelling sheet, flat-bed filters have been proposed. It has been customary to pump the contaminated liquid by means of a pressure pump into the upper, or contaminant chamber above the filter to generate a pressure head therein, pressing the fluid components of the contaminant through the filter. This requires seals to provide a tight joint between the inlet chamber portions and the filter paper during the filtration. The contaminant is usually pumped through an inlet conduit to this chamber, so that the pump has to handle the unfiltered contaminated fluid.

A tight seal of the housing portion of the filter which defines the contaminant chamber customarily includes sealing covers or elements which close off slits through which the filter web, typically filter paper, can be pulled for replacement thereof when the filter paper has become clogged with solids. These sealing edges or sealing covers clamp against the filter web or the support plate. The openings to be sealed preferbly are held as small as possible. The sealing mechanism usually is required only at the slits through which the paper passes since the overall filter housing can be constructed as a unitary structure, closing off the filter chamber at both longitudinal sides of the filter web. Upon application of contaminant into the contaminant chamber, under pressure, it is difficult to prevent escape of contaminant, and particularly liquid components thereof, through the slits through which the filter paper enters the filter chamber, even if the seals are tightly formed. As contaminant enters the filter chamber, the area around the seal itself is subject to caking of contaminant solids, which frequently interferes with proper sealing upon replacement of a strip of filter paper on the flat bed.

Filter structures in which the filter paper alone separates the contaminant chamber from the filtrate chamber additionally have the disadvantage that liquid components of the contaminated fluid, and carrying only a minor portion of contaminating solids, can pass around the edges of the filter paper and thus contaminate the liquid in the filtrate chamber. To prevent such bypassing of the filter paper, additional sealing arrangements are required to clamp the longitudinal edges of the filter web to portions of the housing structure defining the contaminant chamber. Those sealing edges are also subject to deposition of solids and improper sealing upon release of pressure in the contaminant chamber, and movement of the filter paper to a new portion thereof.

Structures of the previously proposed type usually use a large filtrate chamber, the bottom of which is connected to a pump or to a gravity line through which filtered fluid is removed, for example for collection in a tank and for recycling, or for disposal as filtered fluid. If a pump is provided, then it is usually of a pumping capacity to insure removal of the filtered fluid and pumping thereof into a storage or further disposal tank.

It has already been proposed to temporarily clamp the edges of a web of filter paper in a vertically movable frame defining the circumference of a contaminant chamber. If the filter paper is to be replaced with a new strip, the chambers are separated so that the band can be moved to place a new stretch of filter paper into the chamber, the frame then being lowered against the filter paper. The material to be filtered is supplied under pressure into the contaminant chamber, the seal against escape of contaminant being obtained by application of substantial pressure of the edge of the upper filter chamber, formed by the frame, against the filter material itself.

THE INVENTION

It is an object to simplify the construction of a travelling web, flat-bed filter in which sealing problems are overcome, escape of contaminated fluid is prevented, and wear and tear on all apparatus portions of the filtration system is minimized.

Briefly, the filter paper is supported on a perforated plate dividing the filter chamber into an upper contaminant chamber and a lower filtrate chamber, the lower filtrate chamber preferably having a volume which is small with respect to the upper contaminant chamber. The web of filter medium is introduced into the chamber, and a housing portion defining the contaminant chamber is lowered so that its edges engage the filter medium, typically filter paper, at all sides. In contrast to the prior art, contaminated fluid is not supplied under pressure to the contaminant chamber, however, but rather only led thereto by a conduit means extending from a contaminant tank or supply to that portion of the housing forming the upper contaminant chamber. A vacuum and suction pump is connected to the filtrate chamber, forming the sole source of pressure differential to move the fluid from the contaminant tank and through the filter paper to the filtrate outlet. The pump then is required only to pump already filtered fluid and not handle any solids suspended in the contaminated fluid which is to be filtered.

The apparatus is particularly useful for the filtration of liquids which contain suspended particles having abrasive or cutting characteristics, both of which are highly destructive to a pressure pump. A typical application is the filtration of used cutting fluids employed in the machine tool industry, in which cutting or cooling fluids removed from machine tools are recycled. These cutting and cooling fluids will have metal chips transported therewith. If the cutting or cooling fluids were employed in steel working, steel chips with sharp edges and corners are transported therewith which lead to rapid wear and destruction of pumps. Another application is the pumping of municipal or industrial sewage or sludge containing a high degree of suspended solids which, additionally, may be biologically toxic. Pumping of such a material is difficult and maintenance or repair of pumping equipment, or replacement of pump elements is potentially hazardous. The filter can be used in applications in which previously filters of this kind could not be employed, for example in the preparation of edible oils. In the manufacture of salad oil, for example, it is customary to extract coarsely ground seeds with hexane. The oil is dissolved by the hexane and the resulting miscella is then distilled in order to reclaim the oil free from hexane. The filter can be used to remove the solids from the miscella before distillation, fully automatically, and in essentially continuous operation, with recovery of the miscella cake, as dried. This permits elimination of pressure vessel filters in which a filter chamber, filled with hexane, must be emptied in order to dry the filter cake. Drying of the filter cake cannot be carried out immediately and by means of compressed air, or heated compressed air, but rather with a neutral gas due to the danger of explosion caused by residual hexane in the cake. Such an arrangement requires costly apparatus and use of costly gases, which can be avoided by first filtering the miscella in a filter of the present invention. A typical use of such a filter is the separation of waxy substances from sunflower seed oil. A filter surface of about 5 $m^2$ installed in a filter system of the present application can filter from 30 to 60 tons of sunflower seed oil per day. The filter can also be used in the food industry for filtration of other types of oil, wine, sugar, molasses, or the like.

Small versions of the filter system can be used for filtration of blood or other biological substances, in which the filtration speed is automatically matched to the degree of solids of the biological fluid supplied thereto, with complete isolation from the environment, to provide for sterility or prevent escape of possibly toxic components. Previously used vacuum rotary filters are difficult to keep sterile, since the rotary filters are engaged only over a portion of their circumference with the medium to be filtered, and require a powerful and more mechanically complicated source of vacuum since it is difficult to retain a major portion of the filter web surface within the liquid to be filtered, for example blood.

Use of a single combination vacuum-suction pressure pump permits simplified automatic sequencing control of the entire system by well-known sequencing control switches connected to a central station which can carry out the supply of contaminant to the contaminant chamber, or stopping of the supply and replacement of a length of filter material in accordance with an automatic program, controlled from the rise of pressure within the contaminant chamber. This permits decreasing the time of the filtration cycle and improves the filtration throughput.

The combination vacuum-suction pressure pump, arranged only in the filter chamber, permits use of simple sealing arrangements of the contaminant chamber against the filter paper. Any lack of tight seal will not cause escape of contaminant, but rather will cause air to be sucked in from the outside. The stream of air right at the gap within the sealing area will clear any possible obstruction, thus effectively insuring automatic resealing thereof. Thus, the system is essentially self-cleaning and self-clearing in case solid particles derived from the contaminated fluid should lodge adjacent the sealing area. This is in contrast to structures of the prior art in which contaminant is supplied under pressure to the contaminant chamber, so that solid particles will have the tendency to lodge at the edges of the chamber, that is, at the points where the sealing problems arise. The arrangement of the pump, and in the form of a combination suction-vacuum pump, i.e. a combination pneumatic-hydraulic pump tends to move any filtrate away from the edges of the filter itself.

The system and apparatus in accordance with the present invention thus applies the fluid to be filtered to the filter paper by means of a single pump alone which is arranged in the suction line, that is, in the filtrate, or exit line from the filter structure itself. By generating an underpressure or vacuum in the filter chamber, the single pump will simultaneously cause movement of the contaminated fluid from a supply tank or other supply vessel to the contaminant chamber and additionally cause movement of the fluid portions thereof through the filter web or filter paper, while preventing passage of solid particles to the pump which may affect its operation or durability. It is not necessary that the entire contaminant chamber be filled with filter fluid, while still providing for pressure differential through the filter web. No venting of entrained air or gas contained in the contaminated fluid within the contaminant chamber during filtration is necessary. No particularly heavy or sturdy pressure arrangements to press the portion of the housing defining the contaminant chamber against the filter paper are necessary, since the underpressure or partial vacuum therein will additionally insure tight engagement of the housing portion forming the contaminant chamber against the filter paper. This permits simple seal construction, and the use of low-cost materials and shapes for the housing structure of the entire filter. Penetration of some air from the outside into the filter chamber itself requires only negligible additional power and is not a substantial disadvantage of the system, and greatly outweighed by the resultant benefits obtained.

The filter can be constructed to be compact and requiring but little space. Preferably, the filtrate chamber is defined by a perforated plate located on longitudinal support pins or support elements, the support pins or support elements spacing the perforated plate from a lower filter housing plate defining the filtrate chamber and forming part of the overall filter housing structure. The filtrate chamber thus can be constructed to have but little height, just enough to space the perforated plate, forming the support for the filter paper, from the bottom wall of the housing to permit filtrate to be collected therein and removed by the combination suction-vacuum pump, so that not only the overall height of the structure can be reduced but, additionally, the air volume to be handled by the pump can be kept to a minimum.

The cover portion of the housing of the filter defining the contaminant chamber preferably is bell-shaped with, for example, square cross-section at the bottom, formed with edges which match the edges of the filter paper, and bearing against a solid portion of the perforated plate, or against an upturned lip of the bottom plate of the filter housing. Since the contaminant chamber, in contrast to prior structures, will not have atmospheric overpressure therein but, rather, will be under vacuum, or underpressure with respect to atmospheric, the underpressure of the vacuum pump itself will assist in providing for a tight seal without requiring high compressive forces applied against the upper housing bell to effect a seal of the edges of the bell against the filter paper. Additional pneumatic or hydraulic sealing strips, hydraulically or pneumatically controlled, inflatable rubber edges, and the like, can thus be omitted.

The filter can be combined with various automatic control systems so that filter cycles can be carried out essentially automatically.

Figure 1:
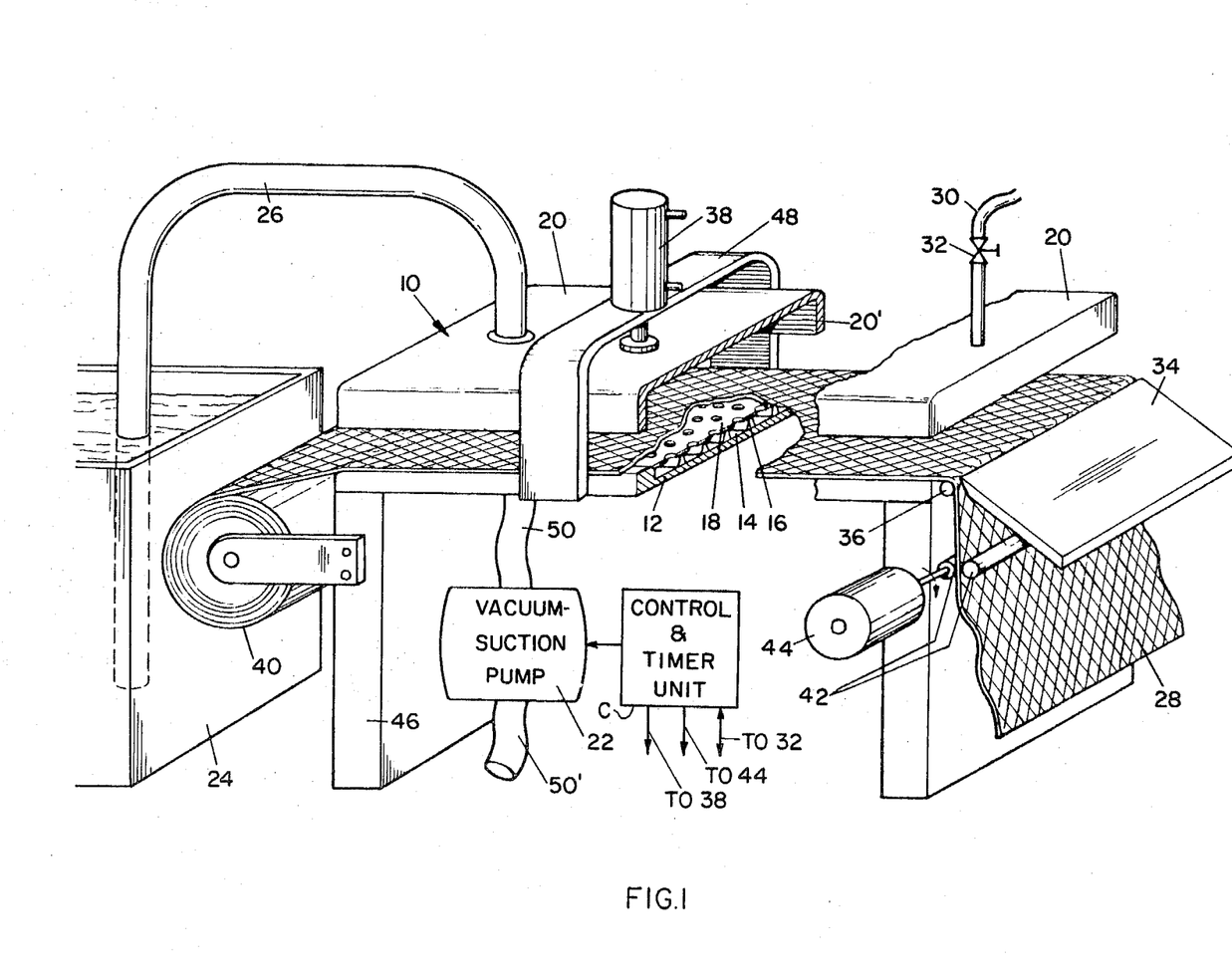
FIG. 1 is a general schematic diagram of the apparatus, partly in section and broken away, and partly in perspective, of the apparatus and system in accordance with the present invention.

Referring first to FIG. 1: A machine frame 46 supports a filter chamber structure 10 which is defined by a bottom filter plate 12 and a top cover 20. The top cover is dome-shaped so that between plate 12 and cover 20 a chamber is defined which is subdivided into an upper chamber 20' in which contaminated fluid to be filtered is introduced, and a lower chamber 14 from which the filtrate is removed. The frame 46 carries a supply roller 40 on which a filter web 28 is rolled. The web 28, typically filter paper, is guided between filter plate 12 and the cover 20. After leaving the filter chamber, it is guided over a deflection roller 36 to two pull-off rollers 42, at least one of which is driven by a pull-off motor 44, secured below filter plate 12 to the frame structure 46. The holding brackets for the motor, rollers and the like have been omitted for simplicity and can be any suitable structural components, such as angle irons and the like.

The contaminated fluid to be filtered is removed from a contaminant tank 24 over an inlet conduit 26 to the interior of the contaminate chamber 20' defined between the top cover 20 and the filter paper 28. It will distribute itself essentially uniformly over the filter paper 28. Filter paper 28 is supported on a perforated support plate 18. The medium to be filtered is removed from the filtrate chamber 14 defined beneath the support plate 18 by a vacuum-suction pump 22 connected to a fluid outlet line 50. The pump 22 delivers the clear filtrate through a pump outlet line 50' to a suitable vessel or container, for example for recycling of the filtrate, for collection, subsequent use, or disposal. A doctor blade 34 is located immediately adjacent the deflection roller 36 to remove the filter cake, formed by solids retained on the web 28 of the filter medium.

The filter plate 12 has upstanding lips, so that it is essentially pan-shaped. It is formed with vertically extending projections or legs 16 to space perforate plate 18 from the bottom of filter plate 12, to define between plate 18 and the filter plate 12 the filtrate chamber 14. The support plate 18 preferably is a sheet of perforated sheet metal and fits flush to the surrounding edges of the filter plate 12.

A bail-shaped frame 48 is secured to the sides of filter plate 12. Frame member 48 carries a pressure cylinder 38 connected, for example, to a source of compressed air or other compressed fluid, for pressure-fluid movement of the cover 20. An air line 30 extends from the cover 20. A vent valve 32 is located in the line 30, the valve 32 preferably being of an automatic pressure sensing type so that when a predetermined pressure within the filter chamber 10 is sensed, the valve 32 opens automatically. Valve 32, as will appear, may also be externally controlled.

Operation: Liquid to be filtered is drawn out from line 50 into line 50' by the vacuum and suction pump 22, for pumping into a suitable container, not shown.

In the position shown in FIG. 1, motor 44 can be energized for a suitable period of time to move the filter paper 28 from supply roller 40 over the support plate 18 and deflection roller 36 between the drive rollers 42. The motor is then stopped and cylinder 38 energized to drop the cover 20 on the new strip of filter paper 28. The cover 20 has an essentially square lower edge profile, so that the edge portions thereof engage the edges of the filter plate 12, with the filter paper 28 therebetween. The area of the filter paper 28 now located within the filter chamber 10 is supported by the perforated support plate 18. When the cover 20 has been lowered and set on the filter plate 12, pump 22 is energized. This causes a vacuum within the filter chamber and, through the filter, will draw contaminated liquid from the contaminant tank 24 into the contaminant chamber 20' beneath cover 20 and the portion of the filter paper 28 within the filter chamber. The liquid will distribute itself approximately uniformly over the filter paper. The valve 32 is closed so that underpressure of a partial vacuum will result within the upper as well as lower filter chambers, that is, beneath cover 20 as well as within chamber 14. The mixture of filtrate, that is, filtered liquid and air, is sucked through the filter paper 28 by the vacuum-suction pump 22 and is delivered over line 50' to the filtrate receiving tank, not shown. Solid particles which are being filtered, sludge, and the like, will separate as a filter cake on the web 28. When the contaminant chamber 20', that is, the chamber beneath cover 20, is filled with solid particles or residues to be filtered or, if the pressure differential, that is effectively the vacuum, has reached a predetermined value, as sensed by the pressure (or, rather, vacuum) setting of valve 32, or if the filter cake on web 28 has reached a certain height, which can be sensed by a suitable feeler, not shown, valve 32 in vent line 30 is opened. Control of valve 32, therefore, can be effected in various ways—sensing the height of the filter cake, pressure drop, or the like. When valve 32 opens, the vacuum in chamber 20' is broken. Pump 22 will now suck air through line 30 and through the filter cake on the strip of filter web 28 beneath the chamber, and through the filter paper 28. Any liquid still in the line 26 will flow back into tank 24 since syphoning action is interrupted by the opening of vent valve 32. A certain time can now be set by a suitable timer (not shown) during which air is sucked into line 30 by the pump. This air, if the nature of the filter cake and the liquid to be filtered permits, can be heated. This time determines a drying time during which the filter cake can be partially or entirely dried; the drying time will depend on the nature of the material to be filtered. Some materials need not be dried at all. After the drying time period has elapsed—if used—the pressure cylinder 38 is suitably controlled to release application pressure and lift cover 20. When cover 20 is being, or has completely lifted, motor 44 is energized so that the pull-off rollers can slowly pull off a strip of paper filter 28 from the filter chamber 10. As the filter paper 28 is deflected from horizontal to vertical position around roller 36, the filter cake is removed by the transversely located doctor blade 34, for guidance to a suitable container (not shown). The filter cake can then be processed, treated, or otherwise handled in accordance with the nature thereof.

The motor 44 will be energized until a clean, new strip of filter paper is located beneath the cover 20, and the cycle will then repeat. The motor 44 is stopped, pressure cylinder 38 again controlled to lower cover 20 over filter plate 12 so that it sealingly engages the new strip of filter paper 28, pump 22 is started, etc.

The foregoing sequence can be automatically controlled by an automatic sequencing timer, under control of a timer relay, so that filtration time and drying time can be set; alternatively, the filtration time can be made pressure-dependent, as sensed by valve 32, opening of which provides a control signal to the control unit C to start a drying time interval.

The filter chamber 14 is shallow; the cover 20 likewise is a shallow hood, so that the entire filter apparatus 10 requires but little vertical space. A single vacuum-suction pump 22 is used which permits both suction of the liquid to be removed from the contaminant tank 24, through the supply line 26, without any intermediate pumping or other motor-driven element, while simultaneously effecting sucking off of the filtered, clear liquid through the filter web 28. This also provides for essentially sealed connection of the cover 20 to seal the chamber 20' during the filtration process; interruption of flow, and deposits of solids in the line 26, at pumps, or the like, and within the chamber 20' is essentially prevented, the pump 22 only handling fluid which already has passed through the filter web 28 and hence has been filtered.

FIG. 1 schematically shows the control and timer unit C and connection lines to, respectively, elements 22, 38 and 44. The line to valve 32 has a double arrow, to show that the valve can be controlled from unit C, and/or can supply signals to the unit C.

The embodiments illustrated in FIGS. 2–9 are similar to the one described and identical elements have been given identical reference numerals, and will not be described again. Elements which are similar, but not identical, have been given reference numerals incremented by a hundred digit related to the figure number.

Figure 2:
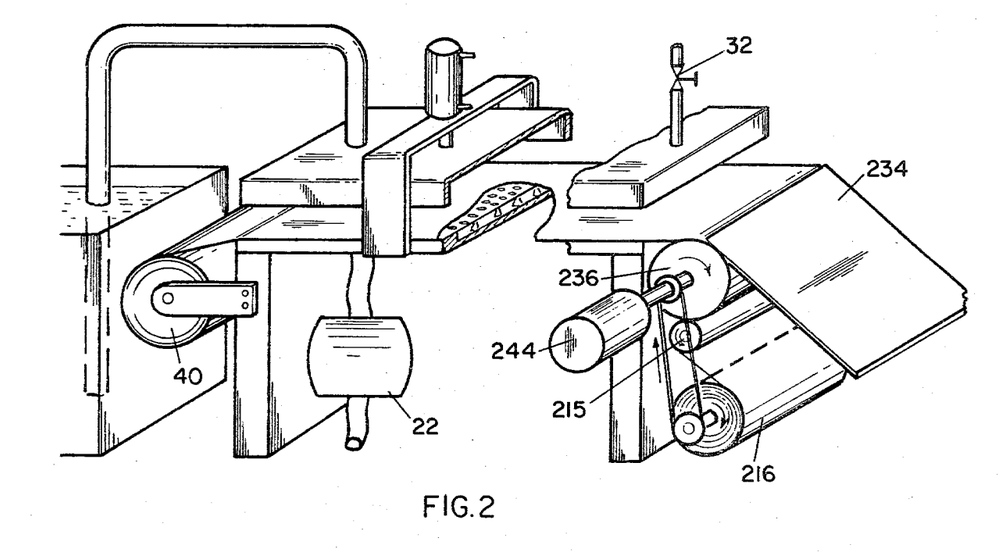
FIG. 2 is similar to FIG. 1 and illustrates a modified pull-off mechanism.

FIG. 2: If the filtrate has a high liquid content, and the filter paper 28 is not highly resistant to the liquid, it may tear at the engagement point of the pull-off rollers 42. Torn paper may thus wind up on one or both of the rollers 42. The tendency to tear and to wind up on a pull-off roller can be essentially avoided by replacing the deflection roller 36 (FIG. 1) with a deflection cylinder 236, driven by motor 244, in which the deflection cylinder 236 has a substantially larger diameter than a deflection roller, as schematically indicated in FIG. 2. The surface of the cylinder 236 should be sufficient to provide for extensive frictional engagement of the web 28 so that the per-square-unit force applied to the web is small, and within the strength of the web, even after it has been wetted, or soaked by the liquid to be filtered. The surface of cylinder 236 is a friction surface, e.g. is rubberized, engaged by at least ⅓ of its circumference, preferably more, by the paper 28. The frictional engagement of the web with the roller 236, thus, should be strong enough to cause adhesion of the web 28 to the roller 236 while providing sufficient pull on the web to permit removal of the filter cake by the doctor blade 234. Sufficient circumferential engagement of the filter paper can be insured by providing an additional deflection roller 215, the web then being rolled on a take-up roll 216. Preferably, take-up roll 216 is driven over a slip clutch or slip arrangement to provide for tension on roll 216 as the diameter thereof changes. This arrangement is particularly suitable if the contaminant contains a high degree of water, and the filter paper is subject to tearing, when wetted.

Figure 3:
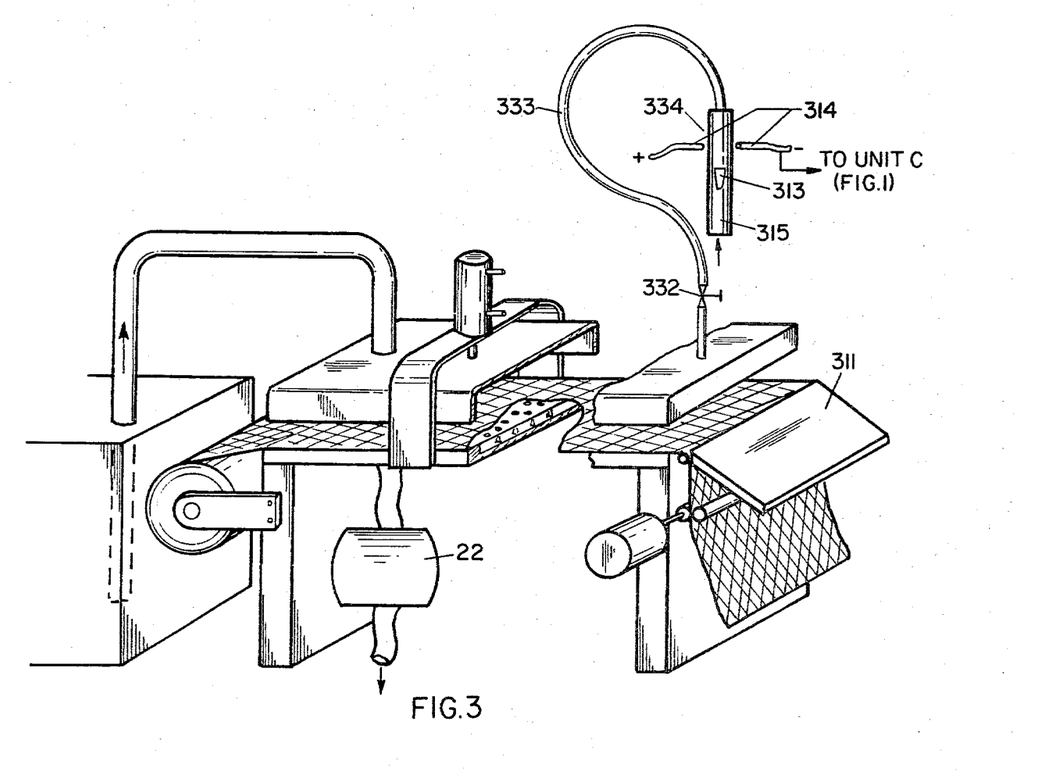
FIG. 3 illustrates an arrangement to provide for automatic vacuum sensing.

FIG. 3: If the contaminated liquid varies widely in consistency, it is difficulty to dry the filter cake only in dependence on time. In such installations, the vent valve 332 is connected to an air line 333 which, in turn is connected to an air flow sensor 334. A particularly simple and sensitive air flow sensor 334 includes a light gate formed by a light emitter and light receiver arrangement 314 located opposite a glass tube 315 in which an opaque float 313 is suspended. The glass tube 315 is slightly conical (not visible in the drawings). Any fixed filtration process is associated with a certain air flow. The level position of the light gate 314 is set with respect to the position of glass tube 315. After the filtration process has been carried out, valve 332 opens and, as air flows through tube 315, lifts the float body 313. When the vacuum is high enough to lift the float body 313 in the light path of the light gate 314, the light gate closes by interrupting a beam of light between the transmitter and receiver, which triggers a control signal being applied to unit C (FIG. 1). Tube 315 is open to free air at its bottom. The light transmitter - receiver may, for example, include a light-emitting diode (LED) emitting light in a predetermined spectral range in a narrow beam to a photosensitive diode or transistor located at the opposite side of glass tube 315, and responsive to the particular wave length of radiation. The photo transistor then provides a signal to unit C (FIG. 1) when the light beam is interrupted, or its intensity changes substantially.

The usual type of flat-bed filter uses a paper web as the filter medium. Tearing of the filter medium at the pull-off rollers can be prevented to a great extent by the structure of FIG. 2 and using a doctor blade 311, similar to blades 34, 234; nevertheless, it is still possible that the paper medium will tear. To permit fully automatic operation, continuity of the paper supply should be insured.

Figure 4:
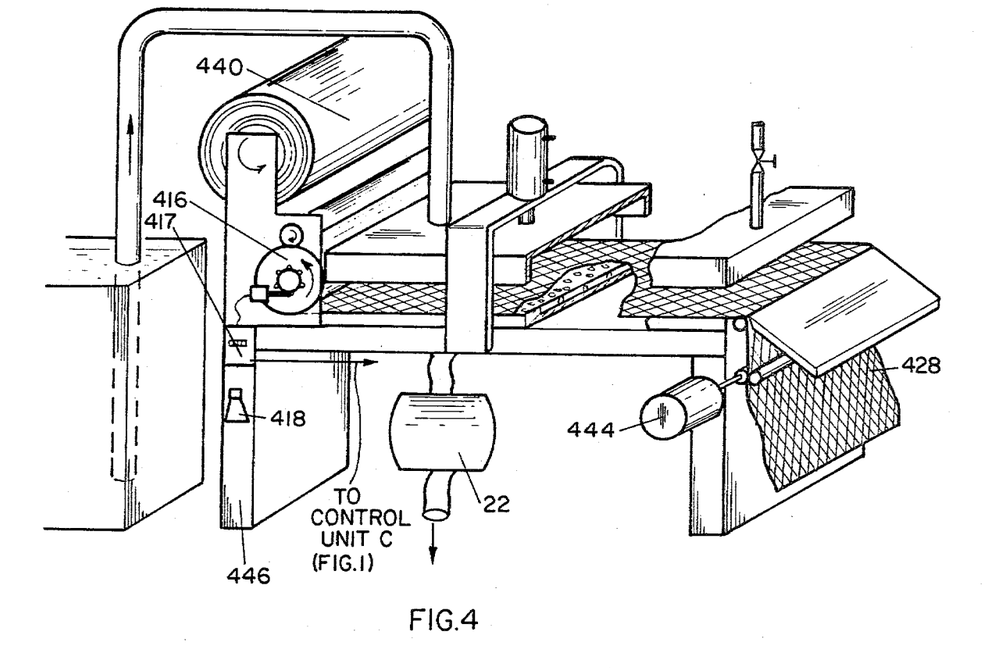
FIG. 4 shows a modified form of the apparatus with a filter band continuity testing and alarm arrangement.

FIG. 4 illustrates a modification of the apparatus in which the frame 446 carries the paper supply roller 440 from which paper web 428 is paid out. An idler roller 416 is in engagement with the web as it is being removed from supply roll 440. Idler roller 416 is connected to a counter 417 which measures a certain length of paper roll being pulled off for each operating cycle. If the counter 417 does not reach a predetermined length, an alarm is given, for example by an audible alarm signal provided by a horn 418. The counter can be mechanical, by engagement of count pins with a lever, as shown, or can be electrical or electronic. If the counter has counted the appropriate length of pull-off, it is preferably reset simultaneously with deenergization of the pull-off motor 444, as controlled by the control unit C.

Some filter webs require preconditioning, particularly to activate the filter, for example to provide a preconditioning filter layer on one or more filter elements, especially if the filter web is a composite. The filter web may require such preconditioning by depositing thereon a filtration substance or filtration layer which it will accept, the filter medium 528 then acting only as a carrier for the actual filtering substance supplied thereto. The filter medium 528 then usually provides a relatively coarse surface, similar to a sieve. This surface permits intensive cleaning after the filtration process. To pretreat the surface, it has previously been customary to use a supply vessel containing the pretreatment liquid in clear and clean form, in which the auxiliary filter material is suspended. This suspension is pumped through the filter and back into the suspension liquid until the auxiliary suspension material is essentially entirely retained by the filter medium and is uniformly deposited thereon. This method is comparatively time-consuming, unreliable with respect to uniformity of deposition, and equipment-intensive.

Figure 5:
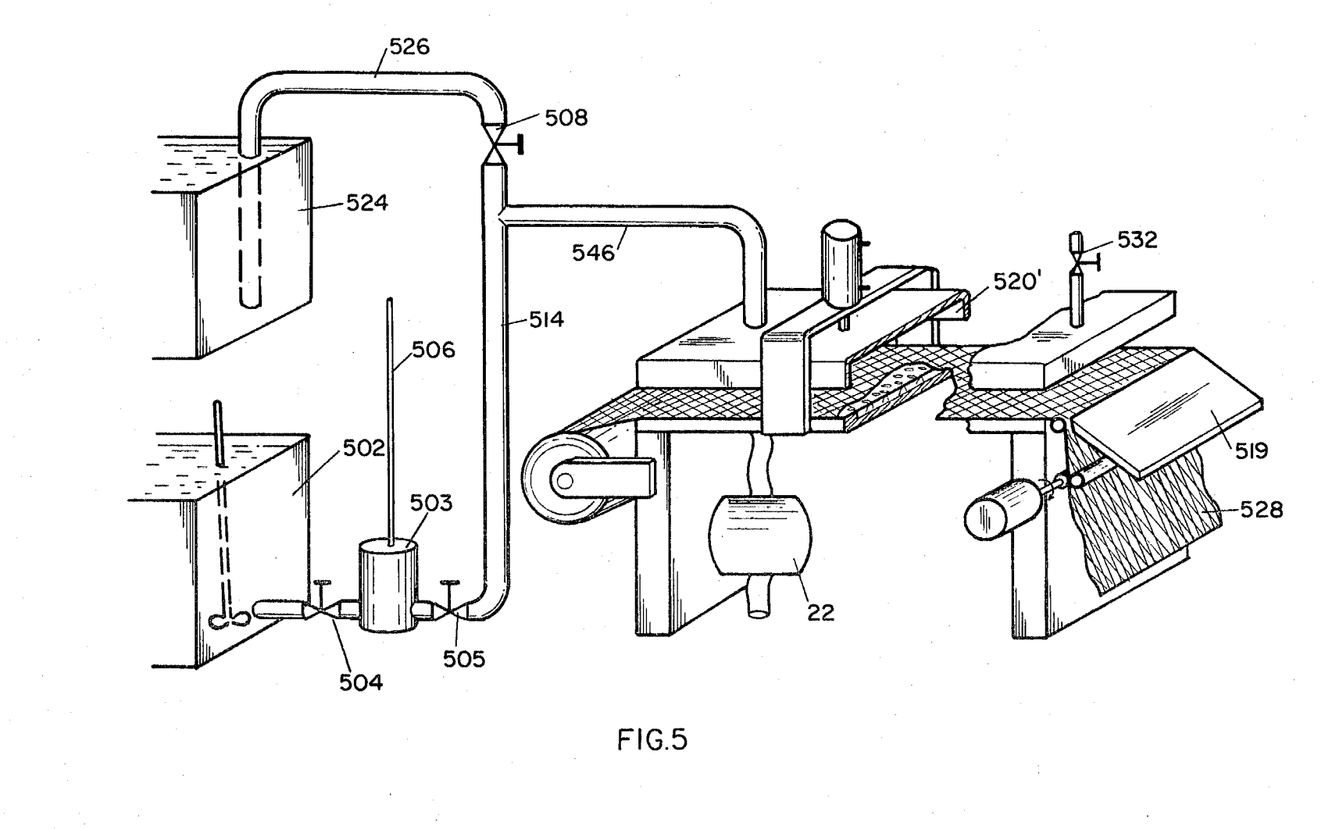
FIG. 5 shows the arrangement in combination with a preconditioning system.

FIG. 5 illustrates a combined arrangement in which auxiliary filtration suspension liquid is retained in an auxiliary tank 502, to be conducted through a valve 504 into a holding vessel 503, to be then supplied to the filter chamber 520' under control of a valve 505.

Operation of the embodiment of FIG. 5: To pretreat the filter, pump 22 is energized and, simultaneously, valve 504 is opened. After a predetermined period of time, during which the holding vessel 503 is filled, valve 504 is closed and valve 505 is opened. The content of holding vessel 3 is removed through suction line 514 and common line 546. This preconditions the filter web material 528 within the chamber 520' which, of course, had been closed before starting of pump 22. When vessel 503 is about empty, for example as sensed by air flow through vent pipe 506, a layer of filter suspension material will be deposited over the surface of the web 528. This layer, actually, is the primary filter medium for the contaminated fluid from tank 524 which is to be filtered.

After the filter medium 528 has been conditioned, and valve 505 closed, valve 508 is opened, with continued operation of pump 22, to suck contaminated liquid through the line 526 and the common connecting line 546.

The illustration of FIG. 5 should not be taken as implying that the tanks 524 and 502 are above each other; rather, to prevent backwash from tank 526 to tank 503, the valve 505 should be located, preferably, slightly above valve 508.

The contaminated fluid from tank 524 is sucked by pump 22 through the treated filter web 528. After filtration, valve 532 is opened, and the remainder of the cycle can be as previously explained in connection with FIG. 1. Doctor blade 519 strips off the filter cake.

Figure 6:
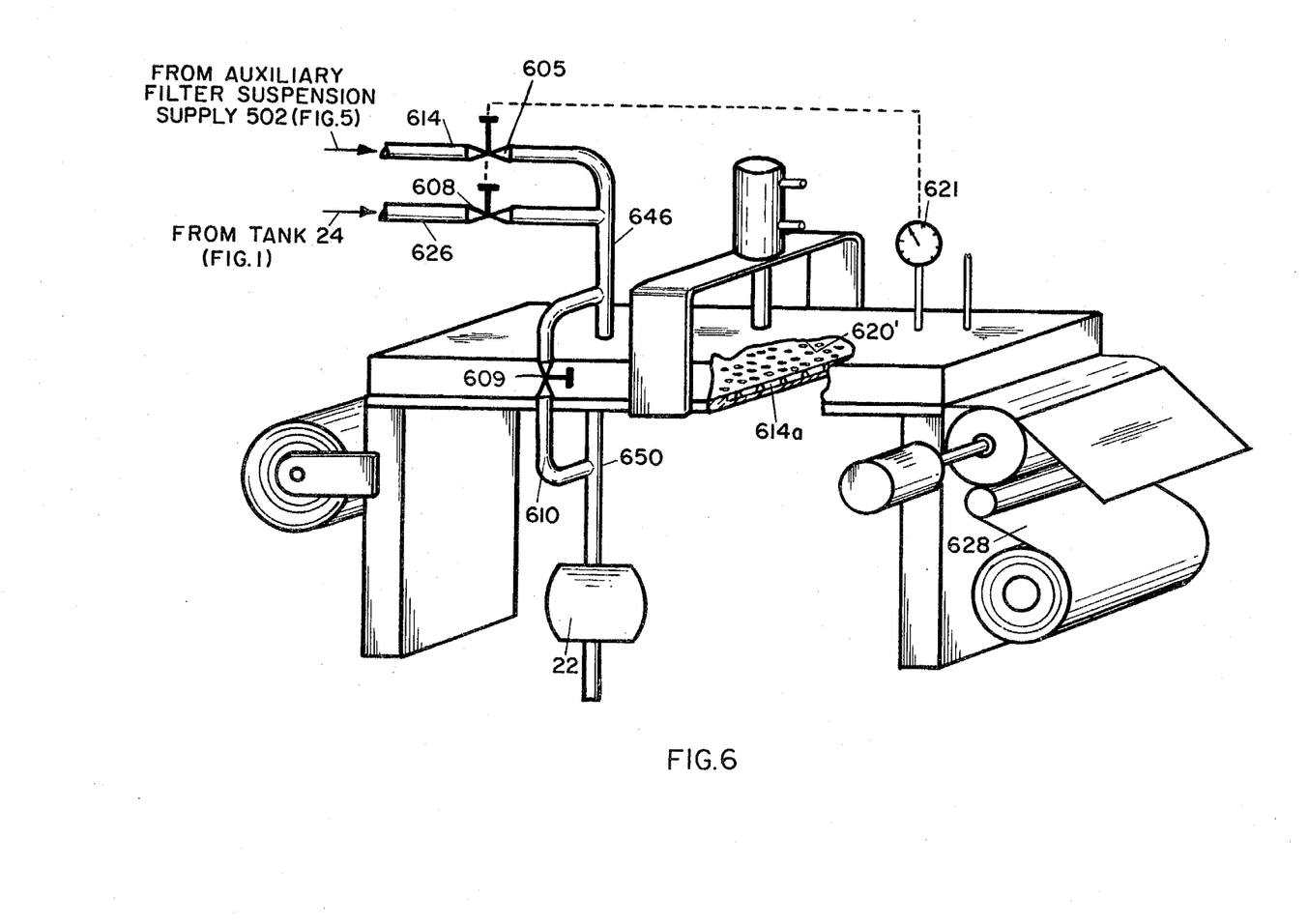
FIG. 6 shows the apparatus applied to another preconditioning system.

FIG. 6 illustrates another arrangement to provide an auxiliary filter layer on filter web 628. A pressure sensing element, or manometer 621 is connected to the contaminant chamber 620'. An inlet line 614, connected to an auxiliary filter suspension supply tank 502, or 503, respectively (FIG. 5), is connected through control valve 605 to common inlet duct 646. Inlet line 626 is connected through valve 608 to the common inlet line 646. The common inlet line 646 is connected to a bypass line 610, with a control valve 609 interposed, to the inlet line 650 of vacuum-suction pump 22.

Operation: The chamber 620' is closed, and pump 22 is started. When a certain vacuum is obtained in chamber 620', as measured by the vacuum gauge 621, vacuum gauge 621 provides a signal, for example by its pointer engaging a contact, through the control unit C which commands valve 605 to open, as schematically indicated by the broken-line connection between the gate 621 and valve 605. Valve 605 permits supply of suspended auxiliary filtration fluid to the chamber 620', where the filter suspension will deposit on medium 628. When a suitable quantity of suspension supply has been sucked through the filter, valve 605 will close. It is preferred to let some time elapse during which the essentially uniformly distributed layer of suspended filter material will quiet and settle, so that the major portion of the solid material thereof will be bound by the web of filter medium 628. When the filter material has settled on the web 628, and after elapse of that time, the inlet valve 608 from the contaminant tank 24 is opened so that pump 22 will suck contaminated fluid through pipe 626 and common pipe 646 to the filter chamber 620', where the contaminated fluid is being filtered.

Valve 609 in the bypass line 610 is provided to permit pressure equalization between the contaminant chamber 620' and the filtrate chamber 614 a therebeneath. Valve 609 is normally closed, but can be opened at least in the initial phase when the auxiliary filter suspension is sucked from its supply tank 502, or 503, respectively, by operation of pump 22, and to prevent premature filtration. The auxiliary filter medium frequently is a dry material, suspended in a fluid which need not be a liquid. When valve 609 is opened, so that pump 22 sucks auxiliary filtration material through duct 614 and the open valve 605, a cloud of auxiliary filtration material will form within the contaminant chamber 620' which, upon closing of valve 609, will settle and form the filtration material layer on the medium 628.

The vacuum-suction pump 22 may be of various types. One such pump which has been proposed is a combination of two separate underpressure sources, one being a separate source of vacuum, such as a Venturi arrangement, a water ring pump, or the like, through which the filtrate is sucked into an intermediate or holding vessel and is simultaneously removed therefrom by a separate liquid pump. This arrangement requires separate pumping units and is not suitable for compact installations.

Figure 7:
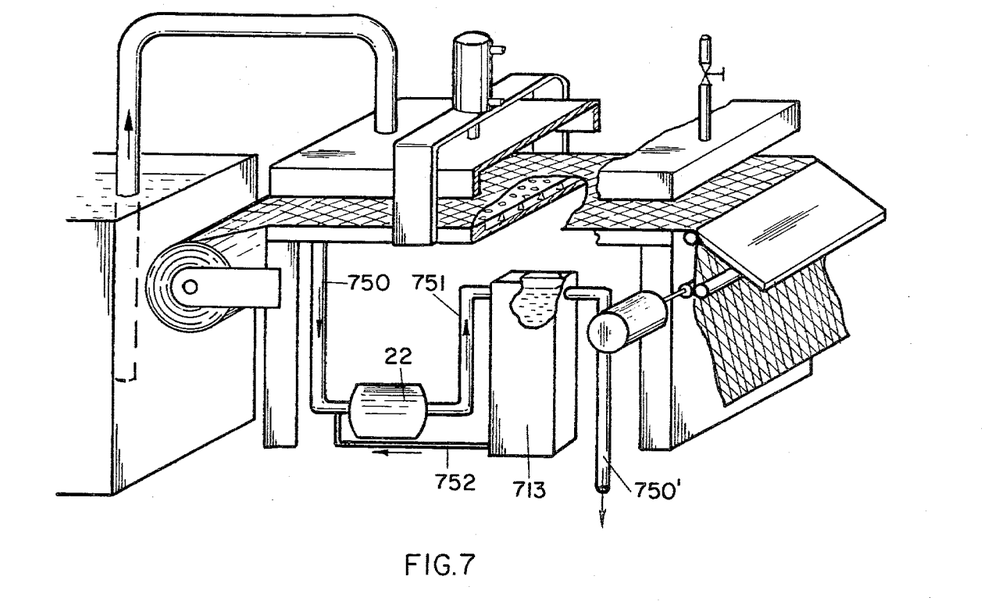
FIG. 7 shows the apparatus in combination with a self-priming system for the pump.

FIG. 7 illustrates an arrangement in which a combined vacuum-and-suction pump is used, forming only a single pumping element. Such combined vacuum-and-suction pumps, frequently of the type of vane pumps, should not operate dry since they are subject to rapid wear or have a high dead space and poor sealing so that, upon dry operation of the pump, the vacuum generated thereby is insufficient.

To prevent damage to combined vacuum-and-suction pump 22, a holding vessel 713 is connected to the outlet of pump 22 through a duct 751, the outlet from tank 713, for example from an overflow thereof, being connected to the outlet 750' of the filtration system. The intermediate or holding tank 713 is connected back to the inlet of the pump 22 through a feedback line 752 which may be small in diameter with respect to the outlet line 750 from the filter and the outlet line 751 from the pump, since it need supply only sufficient filtrate to prevent dry operation of pump 22. Partial feedback of the filtrate by means of line 752, which can be taken from the bottom of tank 713 and supplied to pump 22 by gravity feed, provides sufficient liquid to pump 22 so that it can generate, effectively, the required vacuum and additionally provide for lubrication thereof.

Various types of filtration processes require exclusion of air. This is particularly important in the chemical, pharmacological, and food industries. Air, normally present in chambers 20' (FIG. 1) is then, preferably, replaced by an inert or other gas, such as nitrogen, carbon dioxide, or the like.

It is difficult to effectively prevent ingress of air during filtration due to the essentially open construction of the filters and the presence of the filter paper which, inherently, does not provide for an airtight seal. Filters which are arranged to permit repetitive renewal of the filtering medium, for example the flat-bed travelling web filters, and the filters using a separate filter medium (FIGS. 5, 6), in the past, could not be used with protective gases. The vacuum in vacuum filters itself causes difficulty. Requirement to provide for filtration with exclusion of air frequently arises in connection with the filtration of solvents. Many solvents, however, have a relatively high vapor pressure so that, during filtration, a portion of the filtrate may evaporate. This causes difficulties which, heretofore, required extensive apparatus to prevent malfunction.

To provide for an effective seal of the filter medium 828 with respect to the upper, or contaminant filter chamber 820', the cover or hood 820 is formed with a flat edge which is wide enough to extend over a duct 865 formed in the bottom plate 812, and terminating in an elongated slot 866 extending beneath the edge 867 of the hood 820. The filter medium 828, within the chamber 820', is supported, as before, on a perforated plate 818, spaced by projecting spacers 816 from the filter plate 812 to define the filtrate chamber 814 beneath the filter medium 828. Protective gas is provided to the duct 865 from a supply tank 970 (FIG. 9). Pump 22 has its outlet line 950' connected to two branches 951, 952. A valve 953 is included in branch 951, which is connected to a vent, or an air tank (not shown). Branch 952 is connected by valve 954 to a condensation vessel 955 which has two outlets 956, 957. The outlet 956 is connected through a valve 959 to an inlet line 960 connected to the contaminant chamber 820'. A pressure or, rather, vacuum gauge 921, similar to gauge 621 (FIG. 6), measures the vacuum in chamber 820'. It is connected through a control connection, shown in broken lines, and which may extend through the control unit C (FIG. 1) to an inlet control valve 969 in the inlet duct 926, the input of which is connected to the contaminant tank (not shown in FIG. 9).

Figure 8:
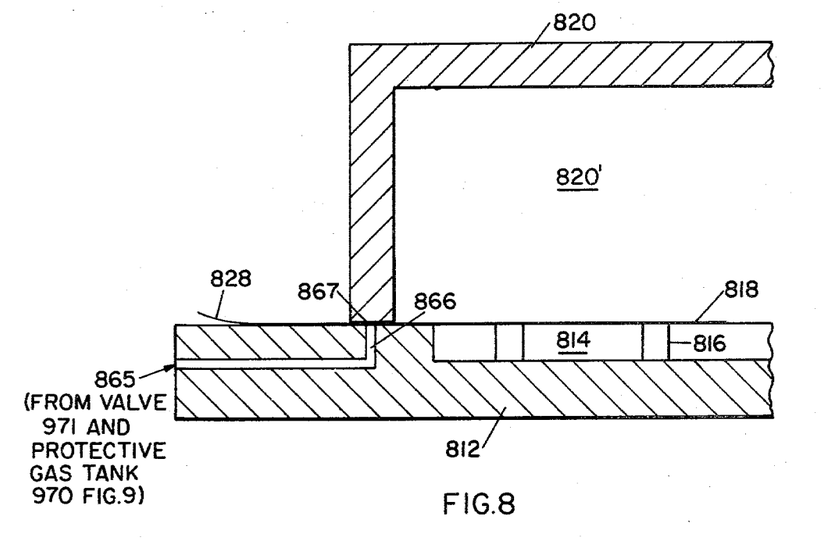
FIG. 8 is a part sectional view of the sealing edge of the housing in which the filtering process is carried out in a protective atmosphere.
Figure 9:
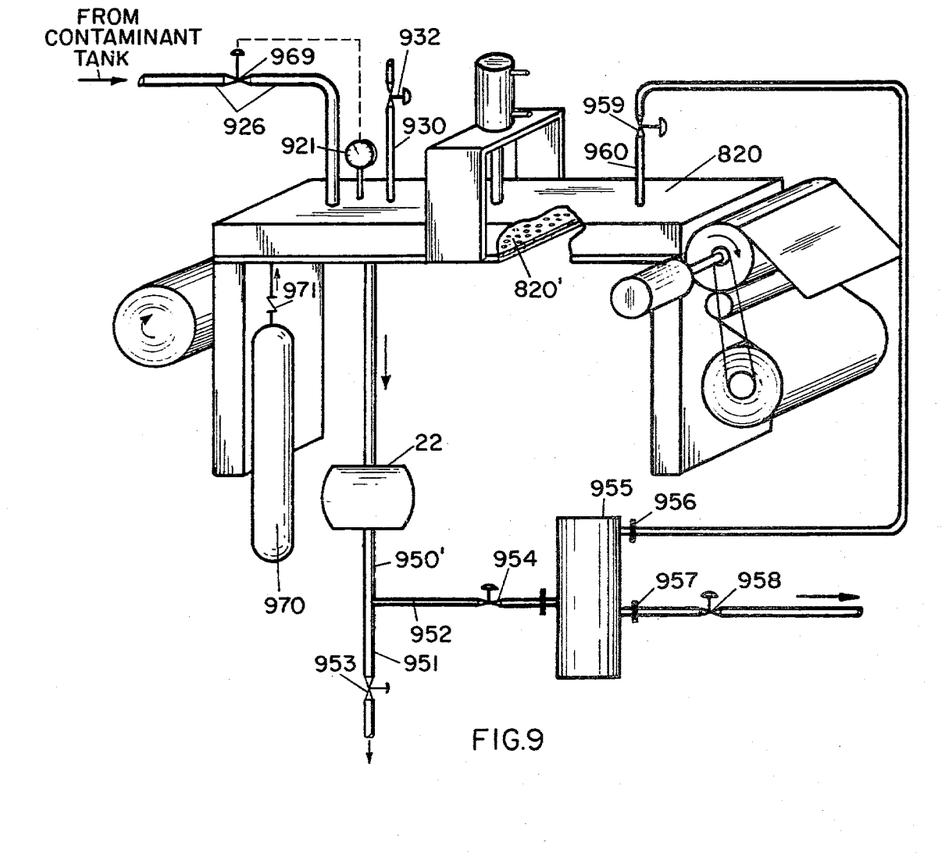
FIG. 9 is a highly schematic illustration of the apparatus when filtration is to be carried out of materials containing fluids of high vapor pressure.

Operation of system, FIGS. 8 and 9: After lowering of the hood 820 on the filter plate 812 (FIG. 8), so that the filter medium 828 is pinched, or clamped between the hood and the plate, protective gas supply valve 971 (FIG. 9) from tank 970 is opened, permitting protective gas to enter into the groove 866 through duct 865, connected to valve 971. All the other valves are closed. Pump 22 is then started and, essentially simultaneously, valve 953 is opened. Pump 22 will thus evacuate the space within the hood 820, that is, the contaminant chamber 820' as well as the filter chamber 814. When a suitable vacuum has been reached, as sensed by gauge 921, gauge 921 will provide a signal, directly or through the control and timer unit C (FIG. 1) to valve 969 to open the line from the contaminant tank and provide contaminated fluid to be filtered to the contaminant chamber 820'. A slight amount of protective gas will penetrate from the groove 866 (FIG. 8) into the chamber 820', thus providing the protective atmosphere within the hood 820', the protective gas excluding ambient air. Filtration will now proceed as before, any leakage at the junction between the hood 820 and the filter plate 812 being leakage of protective gas supplied by tank 970.

Pump 22 will pump filtered liquid through its outlet 950' and through the then opened valve 954 into the holding tank or condensing vessel 955. The valve 953 is closed essentially simultaneously with opening of the contaminant inlet valve 969. The pump 22 will supply the filtered liquid into tank 955 under pressure where vaporized liquids can condense.

After a certain vacuum or underpressure is again reached in the contaminant chamber 820', valve 958 is controlled, directly or through the control unit C (FIG. 1) to close, and valve 959 is controlled to open, thus establishing gas, or vapor communication between tank 955 through line 956 and line 960 with the contaminant chamber 820'. The pump 22 continues to operate, removing remaining liquid and vapor from the chambers 820' and 814; the gas-liquid mixture will collect in the condensing vessel 955. When a predetermined gas flow is sensed through valve 959, valve 959 provides a signal, directly or through control unit C, to valve 18 to drain tank 955.

The filter and contaminant chamber 814, 820' are cleared of protective gas by continuing operation of pump 22. When a predetermined suitable underpressure is reached, as sensed by gauge 921, pump 22 is disconnected, valve 971 is closed, valve 954 from the pump to tank 955 is closed, and valve 958 from tank 955 is likewise closed. The vent valve 932 connected to chamber 820' by pipe 930 is opened to permit venting of the filter chamber 814 and the contaminant chamber 820'. Atmospheric air can then penetrate therein, and the hood 820 lifted.

The filter chamber can be initially evacuated and some protective gas placed therein by leakage of protective gas from the groove 866 through the filter paper into the evacuated chamber 820' which, also, effectively prevents ingress of outside air, and hence contact of the fluid to be filtered with ambient air. Pump 22 is a displacement pump, and thus, during filtration of liquids with high vapor pressure, the portion of the liquids which had previously evaporated under the vacuum will condense again at the pressure side of the pump and will be accepted in the filtrate, held in the condensing tank 955.

The system is characterized by a particularly economical use of protective gas since the dead space to be filled with protective gas is small, and hence the loss of protective gas, during any one operating cycle, is small. The valve 971 from tank 970 can be automatically controlled so that it opens only when the hood 820 is tightly sealed against the filter paper, by means of suitable interlocks (not shown) and well known in the valve control field.

Automatic cycling of the filtration system and apparatus is preferably controlled from the control unit C (FIG. 1) which includes not only a timer, but also sensing and control circuits responsive to pressures (or, rather, vacuums) within the system. A vacuum gauge similar to gauge 921 (FIG. 9) is preferably used in association with all the filter chambers, for example also connected to the unit of FIG. 1, and filtrate permitted to enter the contaminant chamber 20', under control of a valve interposed in line 26 (FIG. 1) only if a predetermined vacuum has been established in the contaminant chamber 20', the predetermined vacuum being sensed by a vacuum gauge such as gauge 921. Presence of an initial vacuum in the filtration chamber thus provides for gradual rise of the filtration difference pressure during the filtration process. This underpressure can be controlled to extend during a predetermined period of time by constructing valve 969 from the contaminant tank as a variable through-put throttling valve, the extent of opening, or throttling, respectively, thereof being controlled by the vacuum, or change in vacuum within the contaminant chamber, as sensed by vacuum gauge 921. Change in vacuum, thus, can control the through-put to be essentially uniform and at an optimum flow rate during an optimum time period with respect to the size of the filter unit. Presence of vacuum in the contaminant chamber during filtration also insures, and supervises, the seal of the hood 20 on the filter plate 12. Drop in vacuum is an indication of penetration of external air, if the system of FIGS. 1–7 are used, or of excess protective gas in the system of FIGS. 8, 9. Monitoring the vacuum in the chamber 20' by a vacuum gauge permits setting of the filtration conditions to start with a predetermined maximum vacuum, and to terminate the filtration process when a certain final vacuum has been reached, the rate of filtration being controlled by controlling the through-put from the contaminant tank, for example by suitable throttling of valve 969. The system of FIGS. 8, 9 can be operated without the addition of protective gas. In such an arrangement, a predetermined vacuum, as sensed by gauge 921, will control valve 969 to then open fully. The actual filtration will start when the filter web material is completely covered by the fluid to be filtered. The vacuum within the filter chamber 814 will provide a continuous gradual rise of the filtration difference pressure. The rate of change of this difference pressure can be controlled to extend over a predetermined and selected time period—depending on the substances to be filtered—by suitable control of the transfer characteristics of rate of change of vacuum as sensed by gauge 921 and throttling of inflow, as controlled by valve 969. Thus, the rate of filtration, and the degree of filtration and its effectiveness can be controlled. When the pressure in the contaminant chamber has reached a certain minimum value, it provides a closing signal to the valve 969, a venting signal to the vent valve 932 and the drying cycle—if needed—and opening and removal cycle of the filtration process can then commence, as described in connection with FIG. 1.

Various changes and modifications may be made, and features described in connection with any one of the embodiments may be used with any of the others, within the scope of the inventive concept.

I claim:

1. Travelling sheet, flat-bed filter apparatus to filter contaminated liquids supplied from a contaminant tank (24) and deliver filtered fluid to a fluid outlet (50) comprising a housing (10; 12, 20) defining a chamber therein and having a bottom wall (12);

a perforate divider means (18) located essentially horizontally and subdividing the chamber into an upper contaminant chamber (20') and a lower filtrate chamber (14) therebelow;

a web of filter medium (28), extending from outside of the housing into the contaminant chamber (20') and therebeyond outside of the housing, the perforate divider means having unperforate, marginal portions;

the housing defining said contaminant chamber including a shallow hood, or cap-shaped element (20) extending over said perforate divider means (28) and having depending edges, said depending edges being positioned to directly engage the web of the filter medium (28) in the region of the marginal unperforate portions of said perforate divider means;

contaminated liquid inlet means formed in said hood, or cap-shaped element (20) and a connection conduit (26) extending between said contaminant tank (24) and the contaminated liquid inlet means to supply liquid to said upper contaminant chamber means (20');

means (44) engageable with said web of filter medium moving fresh filter medium from a supply (40) into the contaminant chamber, and remove used filter medium therefrom;

moving means (38) coupled to the hood, or cap-shaped element (20) to selectively move said depending edges of said element in engagement with the filter medium, or lift them off the filter medium;

filtrate outlet means (50) connected to said filtrate chamber (14);

means to effect sealing engagement of said filter medium (28) with the depending edges of said hood or cap-shaped element (20) and the unperforate marginal portions of the perforate divider means (18) and additionally to move liquid through the filter, comprising a combination of a vacuum and a liquid suction pump means (22) connected to the filtrate chamber (14) and forming the sole source of pressure differential to move the contaminant liquid from the contaminant tank (24) through said conduit means and the inlet means into the contaminant chamber (20'), for filtration by the filter medium (28) and pumping to the fluid outlet (50) to provide for direct supply of liquid from said contaminant tank (24) to the contaminant chamber (20') and exposure of said combination pump means (22) to only fluid which is uncontaminated and simultaneously provide for a vacuum within the contaminant chamber (20') which holds the edges of the movable hood, or cap-shaped element (20) in sealing contact with said filter medium and against the unperforate portions of said perforate divider means (18);

support means (16) located in the lower filtrate chamber (14) and supporting said perforate divider means (18) within the housing spaced from a bottom plate (12) of the housing and wherein, to use the filter as a protected gas or protected atmosphere filter to protect the interior of the filter chamber from contact with the ambient air, the portion of the housing defining said filter chamber (814) and forming the bottom wall comprises a bottom plate (812) having marginal unperforate portions;

the depending edges of the shallow hood, or cap-shaped element (820) engaging said unperforate portions of the bottom plate, with said filter medium interposed;

duct means (865, 866) formed in one of said portions and terminating at the surface facing the other of said portions; and a source (970) of protective gas, said duct means being connected to the source of protective gas to supply protective gas to said contaminant chamber (820') upon vacuum-and-liquid suction operation of said pump means (22), leakage of said gas at the junction of said portions, with said filter medium (828) interposed, introducing said protective gas into said contaminant chamber and preventing ingress of ambient air.

2. Apparatus according to claim 1, wherein said duct means comprises a circumferential groove (866) formed in the bottom plate.

3. Travelling sheet, flat-bed filter apparatus to filter contaminated liquids supplied from a contaminant tank (24) and deliver filtered fluid to a fluid outlet (50) comprising a housing (10; 12, 20) defining a chamber therein and having a bottom wall (12);

a perforate divider means (18) located essentially horizontally and subdividing the chamber into an upper contaminant chamber (20') and a lower filtrate chamber (14) therebelow;

a web of filter medium (28), extending from outside of the housing into the contaminant chamber (20') and therebeyond outside of the housing, the perforate divider means having unperforate, marginal portions;

the housing defining said contaminant chamber including a shallow hood, or cap-shaped element (20) extending over said perforate divider means (28) and having depending edges, said depending edges being positioned to directly engage the web of the filter medium (28) in the region of the marginal unperforate portions of said perforate divider means;

contaminated liquid inlet means formed in said hood, or cap-shaped element (20) and a connection conduit (26) extending between said contaminant tank (24) and the contaminated liquid inlet means to supply liquid to said upper contaminant chamber (20');

means engageable with said web of filter medium moving fresh filter medium from a supply (40) into the contaminant chamber, and remove used filter medium therefrom;

moving means (38) coupled to the hood, or cap-shaped element (20) to selectively move said element in engagement with the filter medium, or lift the depending edges off the filter medium;

filtrate outlet means (50) connected to said filtrate chamber (14);

means to effect sealing engagement of said filter medium (28) with the depending edges of said hood, or cap-shaped element (20) and the unperforate marginal portions of the perforate divider means (18), and additionally to move liquid through the filter, comprising a combination of a vacuum and a liquid suction pump means (22) connected to the filtrate chamber (14) and forming the sole source of pressure differential to move the contaminated liquid from the contaminant tank (24) through said conduit means and the inlet means into the contaminant chamber (20'), for filtration by the filter medium (28) and pumping to the fluid outlet (50) to provide for direct supply of liquid from said contaminant tank (24) to the contaminant chamber (20') and exposure of said combination pump means (22) to only fluid which is contaminated and simultaneously provide for vacuum within the contaminant chamber (20') which holds the depending edges of the movable hood, or cap-shaped element (20) in sealing contact with said filter medium and against the unperforate portions of said perforate divider means (18);

control means (C) cyclically, respectively closing and opening said inlet means and starting operation of said pump means to create a vacuum in the contaminant chamber;

vacuum sensing means (621, 921) connected to said contaminant chamber;

a controlled valve means (969) in the conduit means (926) to control flow of contaminated liquid therethrough;

the control means (C) being additionally connected to for control by said vacuum sensing means and processing the information of sensed vacuum to provide control signals to said controlled valve means (969) having controlled parameters controlling the flow condition of contaminated liquid to the filter as a function of the vacuum in the contaminant chamber;

and wherein, for use as a protected gas or protected atmosphere filter, the portion of the housing defining said filter chamber (814) and forming the bottom wall comprises a bottom plate (812) having marginal unperforate portions;

the depending edges of the shallow hood or cap-shaped element (820) and having marginal portions engaging said unperforate portions of the bottom plate, with said filter medium interposed;

duct means (865, 866) formed in said unperforate portions and terminating at the surface facing, the marginal of said hood or cap-shaped element;

a source (970) of protective gas, said duct means being connected to the source of protective gas to supply protective gas to said contaminant chamber (820') upon vacuum-and-liquid suction operation of said pump means (22), leakage of said gas at the junction of said portions, with said filter medium (828) interposed, introducing said protective gas into said contaminant chamber and preventing ingress of ambient air.

* * * * *